Figure 1:
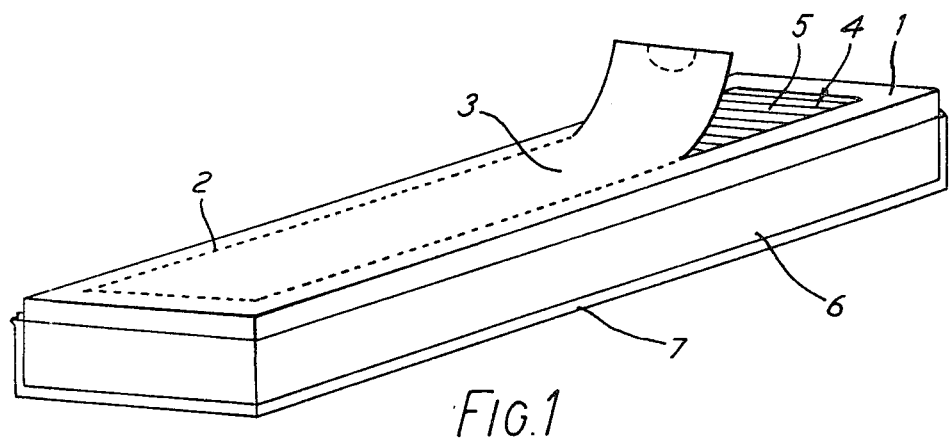

United States Patent [19]

Mules

[11] 4,373,635

[45] Feb. 15, 1983

[54] FILTERS

[75] Inventor: Robert S. Mules, Talbot Green, Wales

[73] Assignee: Fram Europe Limited, Glamorgan, Great Britain

[21] Appl. No.: 307,043

[22] Filed: Sep. 30, 1981

[30] Foreign Application Priority Data

Sep. 23, 1980 [GB] United Kingdom ............... 8030554

[51] Int. Cl.³ ............................................. B65D 85/84
[52] U.S. Cl. ........................................ 206/525; 55/359;
  55/497; 55/521; 55/502; 264/261; 264/DIG. 48; 210/493.1
[58] Field of Search .................... 55/359, 497–500, 55/521, 502; 210/493.1, 493.5, 497.01; 264/DIG. 48, 261, 263; 206/564, 628, 525

[56] References Cited

U.S. PATENT DOCUMENTS

| 2,138,874 | 12/1938 | Myers | 55/359 |
| 3,183,286 | 5/1965 | Harms | 55/497 |
| 3,397,518 | 8/1968 | Rogers | 55/497 |

FOREIGN PATENT DOCUMENTS 1022232  3/1966  United Kingdom ............... 55/521

Primary Examiner—Bernard Nozick
Attorney, Agent, or Firm—Ken C. Decker; William N. Antonis

[57] ABSTRACT

A replaceable filter cartridge has a pleated paper filter medium mounted within a frame or casing having a closed side and an open side, the open side being covered by a removable protective tray or lid the internal shape of which has been used in manufacture for moulding a sealing surface onto the periphery of the frame or casing, the closed side of the frame or casing being provided with a perforated portion which is also removable for use of the filter cartridge.

3 Claims, 4 Drawing Figures

FILTERS

This invention is concerned with fluid filters and their manufacture and it is especially applicable to so-called 'flat' or 'panel' filters, but it is not restricted just to such filters.

Filter cartridges require sealing surfaces in order to form a fluid-tight seal within and against the apparatus, such as a filter housing in which they are to be employed. It has been proposed previously to produce filter cartridges by filling a mould of appropriate configuration with a liquid or pastly sealant material suitable for forming the required sealing surface by cold cure, hot set, and placing the filter medium or media and any support or ancilliary components into the said material. On completion of a suitable curing or setting, the filter cartridge with its integrated sealing surface is removed from the mould and can be packaged for example in a suitable container for despatch to a user. The use of a mould release agent is advantageous and often may be sprayed on to the mould before reuse thereof. The sealant may serve as a combined inter-pleat sealant and end cap in an annular pleated paper filter cartridge or as an edge sealant gasket seal in a panel filter.

The present invention has as an object to simplify the production of such filters and to reduce both labour and material costs.

In one aspect thereof, this invention provides a filter cartridge comprising, a filter medium (4) mounted within a frame or casing (1) solidified sealant (13) into which both the filter medium and frame or casing extend serving both to unite the filter medium and frame or casing and to provide a sealing surface (14) for the filter and a protective tray or lid (6) to the shape of which the sealant was moulded, surrounding and protecting the said sealing surface 14, and being detachable for use of the filter cartridge. The protective tray can preferably be a tray in which the sealant was moulded.

Because the important sealing surface is protected a conventional packaging as provided by a separate container may be avoided although a plastic shrink film may be applied about the cartridge for additional protection. The filter medium is protected by the frame or casing and by the tray the two together effectively acting as a packaging container for the filter the frame or casing suitable carrying fitting instructions trade marks and other identification printed thereon.

In a preferred embodiment the frame or casing includes a perforated top portion requiring detachment as well as the tray by the user to place the filter in use.

As the tray or lid can serve as a one-off mould and as such is left in position by the manufacturer to be detached by the user and since further solid packaging may be unnecessary substantial manufacturing economies are possible in the production of filter cartridges packaged for transport or sale.

In a second and further aspect of the invention a method for the production of filter cartridges packaged for transport or sale is characterised by the steps of dispensing into a tray which is adapted both for use as a one-off mould and as a protection for a sealing surface of the filter cartridge a predetermined quantity of a sealant in liquid or pasty form sinking an end portion of a filter medium and an end portion of a frame or casing for the filter into the sealant in the mould at least before it has completely cured or set so that when the curing or setting of the sealant is complete a unitary filter cartridge consisting of the frame or casing, the filter medium and the sealant results, together with a protective tray for the sealing surface detachable prior to use.

Figure 2:
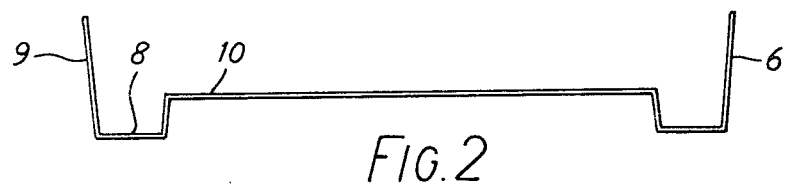
Figure 3:
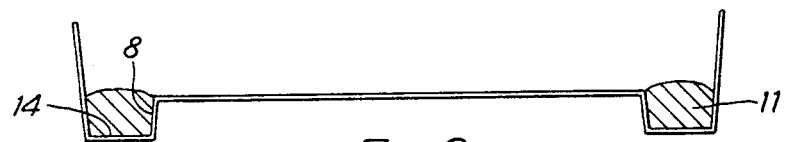
Figure 4:
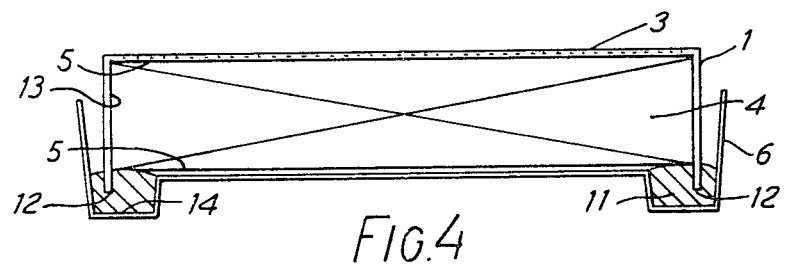

The invention is hereinafter more particularly described by way of example only with reference to the accompanying drawings in which:

FIG. 1 is a perspective view of an embodiment of packaged filter cartridge in accordance with this invention and FIGS. 2, 3 and 4 are similar simplified sectional views illustrating successive stages in the production of the packaged filter cartridge of FIG. 1.

The panel filter cartridge of FIG. 1 has a casing or frame 1 suitably of paperboard having a panel 3 surrounded by perforation at 2 to define a portion 3 readily removable by a user. Mounted within the casing or plane 1 is the filter medium 4, here in the form of a pleated paper element with parallel pleats 5 the ends of adjacent pleats being sealed together by a suitable sealing compound. The cartridge is seated within a disposable plastics tray or lid 6 which covers what is the underside of the cartridge in the view of FIG. 1 where the filter medium would otherwise be exposed and protects sealing surfaces 7 around the edge of the said underside.

To place the cartridge in use tray 6 is detached and a perforated section 3 on the upper surface (in FIG. 1) of the casing 1 is removed the cartridge can then function as a conventional panel filter.

The tray or lid 6 and the casing 1 together serve as a packaging container without need for an additional paperboard carton. Fitting instructions, trade marks and other identification are printed on the casing.

Reference is now made to FIGS. 2, 3 and 4 which schematically illustrate how the packaged filter cartridge of FIG. 1 is produced.

As the sectional view of FIG. 2 shows, tray 6 is of a plastics material and has a well 8 defined between its circumextending upstanding wall 9 and a centrally disposed raised portion 10. Tray 6 is rectangular in form in the case of the panel filter illustrated in FIG. 1, having four straight well lengths along and adjacent the four edges of the tray bottom. If the invention is employed in the manufacture of a cylindrical filter cartridge the well will be annular in form.

The filter medium in the present example is a pleated paper element is formed by a suitable pleating process generally known in the filter making art and deriving this process the ends of the pleats are coated with a settable sealant material 13 so that as they are brought together the ends of adjacent pleats are sealed together. The element is dimensioned to fit into casing or frame 1 with the open edge 12 extending outward of the pleats.

A predetermined quantity of the sealant material 11 is dispensed into well 8 in liquid or pasty form so as to fill it to excess as shown in FIG. 3. Various hot melt, heat curing and cold cure systems are commercially available for this. Preferably however polyurethane which has a two part mix and a cold cure is used for the sealant. The mould/tray 6 would preferably be made of a material such as cardboard or metal foil, rather than of plastics, if a heat cure or hot melt system were to be employed.

The filter medium which here is in the form of a pleated paper element 4 with parallel pleats 5 is placed into the mould/tray 6 so as to enter into the sealant material (FIG. 4), and the frame or case 1 is placed over the filter medium so that the end portion thereof about its lower open edge 12 sinks into the sealant 11 in well 8.

Alternatively, preferred the filter medium is loaded within the frame or case 1, which is then lowered into the mould/tray 6 so that end portions both of the filter material and the frame or case simultaneously sink into the sealant 11 in well 8. Again, although not shown, the filter medium may be sealed or adhered to the inside of the frame or case in the interests of increased rigidity. In either event the sealant is allowed to set or to complete its cure as appropriate resulting in a unitary filter cartridge as shown in FIG. 1.

The mould which is also described herein as a lid or tray is suitably made of a transparent plastics material so that the sealing surface can readily be inspected. The preferred material for the mould is a laminate of pvc with polyethylene, the polyethylene being on the interior surface of the mould to facilitate release without use of mould release agents. Alternatively, the mould could be formed of cardboard or metal foil or other plastic or rubber material.

I claim:

1. In a combination filter cartridge and shipping tray for protecting the filter cartridge, said filter cartridge comprising an array of transversely folded pleats having a pair of opposite ends, the ends of each of said pleats being sealed, a perimetrical strip of sealing material extending around said array for sealing said filter cartridge in use, said shipping tray having an upstanding side wall extending around said cartridge and a raised center portion cooperating with said side wall to define a trough extending around the perimeter of said tray, said trough molding said sealing material into a predetermined shape, the upstanding wall of said tray defining a cavity receiving said filter cartridge and permitting the latter to sealingly engage with the sealing material in said trough when the filter is manufactured whereby the sealing material hardens into a seal carried on said cartridge when the tray is removed from the cartridge, said tray protecting both said seal and said array of pleats, and a protective frame enclosing at least a portion of said array of pleats, said frame including a perimetrically extending portion projecting from said pleats, said projecting portion being embedded in said sealing material.

2. Combination filter cartridge and shipping tray as claimed in claim 1, wherein said array of pleats is arranged in the form of a flat panel defining a pair of opposite surfaces defined by the tips of said pleats and said flat panel defines side wall lengths bounding said array of pleats, said frame including side wall portions bounding said side wall lengths, said upstanding side wall of said tray bounding the side wall portions of the frame, said raised center portion of the tray covering one of said surfaces of said array and protecting said one surface until the tray is removed.

3. Combination filter cartridge and shipping tray as claimed in claim 2, wherein said frame includes a face interconnecting said side wall portions and covering the other of said surfaces defined by said array for protecting said other surface, at least a portion of said face being detachable to expose said array when the cartridge is put into use.

* * * * *